United States Patent
Li et al.

(10) Patent No.: US 11,372,589 B2
(45) Date of Patent: *Jun. 28, 2022

(54) FLASH MEMORY CONTROLLER AND METHOD CAPABLE OF EFFICIENTLY REPORTING DEBUG INFORMATION TO HOST DEVICE

(71) Applicant: Silicon Motion, Inc., Hsinchu County (TW)

(72) Inventors: Kuan-Hui Li, Chiayi (TW); Shang-Ta Yang, Taoyuan (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/952,098

(22) Filed: Nov. 19, 2020

(65) Prior Publication Data

US 2021/0072924 A1    Mar. 11, 2021

Related U.S. Application Data

(63) Continuation of application No. 16/542,313, filed on Aug. 16, 2019, now Pat. No. 10,877,700.

(51) Int. Cl.
| | | |
|---|---|---|
| *G06F 3/06* | (2006.01) | |
| *G06F 9/30* | (2018.01) | |
| *G06F 11/07* | (2006.01) | |
| *G06F 12/02* | (2006.01) | |

(52) U.S. Cl.
CPC .......... *G06F 3/0659* (2013.01); *G06F 3/0607* (2013.01); *G06F 3/0679* (2013.01); *G06F 9/30123* (2013.01); *G06F 11/0757* (2013.01); *G06F 12/0246* (2013.01)

(58) Field of Classification Search
None
See application file for complete search history.

(56) References Cited

U.S. PATENT DOCUMENTS

| | | | |
|---|---|---|---|
| 2008/0055989 A1* | 3/2008 | Lee | ......................... G11C 29/76 365/185.09 |
| 2012/0216079 A1 | 8/2012 | Fai | |
| 2013/0212425 A1 | 8/2013 | Blaine | |

(Continued)

FOREIGN PATENT DOCUMENTS

| | | |
|---|---|---|
| TW | 200739418 | 10/2007 |
| TW | 200809865 | 2/2008 |

(Continued)

*Primary Examiner* — Edward J Dudek, Jr.
*Assistant Examiner* — Ralph A Verderamo, III
(74) *Attorney, Agent, or Firm* — Winston Hsu

(57) ABSTRACT

A method used in a flash memory controller includes: using a watchdog timer to automatically count a number and to generate a reset trigger signal to a processor if the number counted by the watchdog timer is higher than a threshold; after receiving the reset trigger signal from the watchdog timer, using the processor to copy registry information from at least one of processor, flash memory interface controller, and protocol controller, and then to control the memory controller to write the copied registry information into the dynamic random access memory device without rebooting a system of the flash memory controller.

20 Claims, 4 Drawing Sheets

(56) References Cited

U.S. PATENT DOCUMENTS

| | | | |
|---|---|---|---|
| 2013/0227201 A1* | 8/2013 | Talagala | G06F 3/0679 |
| | | | 711/103 |
| 2016/0344834 A1 | 11/2016 | Das | |
| 2017/0004063 A1 | 1/2017 | Broderick | |
| 2017/0102888 A1 | 4/2017 | Lobo | |
| 2017/0102889 A1 | 4/2017 | Lobo | |
| 2019/0259465 A1 | 8/2019 | Subramanian | |
| 2019/0278702 A1 | 9/2019 | Nomura | |
| 2020/0042207 A1 | 2/2020 | Kwak | |

FOREIGN PATENT DOCUMENTS

| | | |
|---|---|---|
| TW | 201316340 A1 | 4/2013 |
| TW | 201715245 A | 5/2017 |

\* cited by examiner

FLASH MEMORY CONTROLLER AND METHOD CAPABLE OF EFFICIENTLY REPORTING DEBUG INFORMATION TO HOST DEVICE

CROSS REFERENCE TO RELATED APPLICATIONS

This continuation application claims the benefit of U.S. application Ser. No. 16/542,313, which was filed on Aug. 16, 2019.

BACKGROUND OF THE INVENTION

1. Field of the Invention

The invention relates to a scheme of flash memory controller testing, and more particularly to a flash memory controller and method capable of efficiently and accurately reporting debug information to a host device when a fault/failure occurs during the testing.

2. Description of the Prior Art

Generally speaking, a user/operator at the factory side may use a conventional testing procedure for testing storage devices at the factory side to simulate the same condition of a fail storage device product so as to analyze and debug the fail storage device product. However, the user/operator at the factory side cannot exactly know which portion such as instructions, firmware, or hardware within one storage device product fails.

SUMMARY OF THE INVENTION

Therefore one of the objectives of the invention is to provide a flash memory controller and a method used in the flash memory controller, to solve the above-mentioned problems.

According to embodiments of the invention, a flash memory controller comprises a watchdog timer, a processor, a memory controller, a flash memory interface controller, and a protocol controller. The watchdog timer is used for automatically counting a number when being powered and for generating a reset trigger signal to a processor if the number counted by the watchdog timer is higher than a specific threshold. The processor is coupled to the watchdog timer and used for receiving the reset trigger signal from the watchdog timer and for controlling other controller circuits. The memory controller is coupled to the processor and is controlled by a first control signal sent from the processor to access a dynamic random access memory device externally coupled to the flash memory controller. The flash memory interface controller is coupled between the processor and a flash memory externally coupled to the flash memory controller and is controlled by a second control signal sent from the processor to control the flash memory interface controller for reading data from the flash memory and writing data into the flash memory. The protocol controller is coupled between the processor and a host device externally coupled to the flash memory controller and is used for receiving a command sent from the host device and controlled by the processor to send a response from the protocol controller to the host device. After receiving the reset trigger signal the processor is arranged to copy registry information from at least one of the processor, the flash memory interface controller, and the protocol controller, and then to control the memory controller to write the copied registry information into the dynamic random access memory device without rebooting a system of the flash memory controller.

According to the embodiments, a method used in a flash memory controller comprises: using a watchdog timer to automatically count a number when being powered and to generate a reset trigger signal to a processor of the flash memory controller if the number counted by the watchdog timer is higher than a specific threshold; receiving the reset trigger signal from the watchdog timer and controlling other controller circuits; sending a first control signal from the processor to a memory controller of the flash memory controller to control the memory controller to access a dynamic random access memory device externally coupled to the flash memory controller; sending a second control signal from the processor to a flash memory interface controller of the flash memory controller to control the flash memory interface controller to read data from a flash memory externally coupled to the flash memory controller and to write data into the flash memory; using a protocol controller to receive a command sent from the host device and using the processor to control the protocol controller to send a response from the protocol controller to the host device; and after receiving the reset trigger signal from the watchdog timer, using the processor to copy registry information from at least one of the processor, the flash memory interface controller, and the protocol controller, and then to control the memory controller to write the copied registry information into the dynamic random access memory device without rebooting a system of the flash memory controller.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
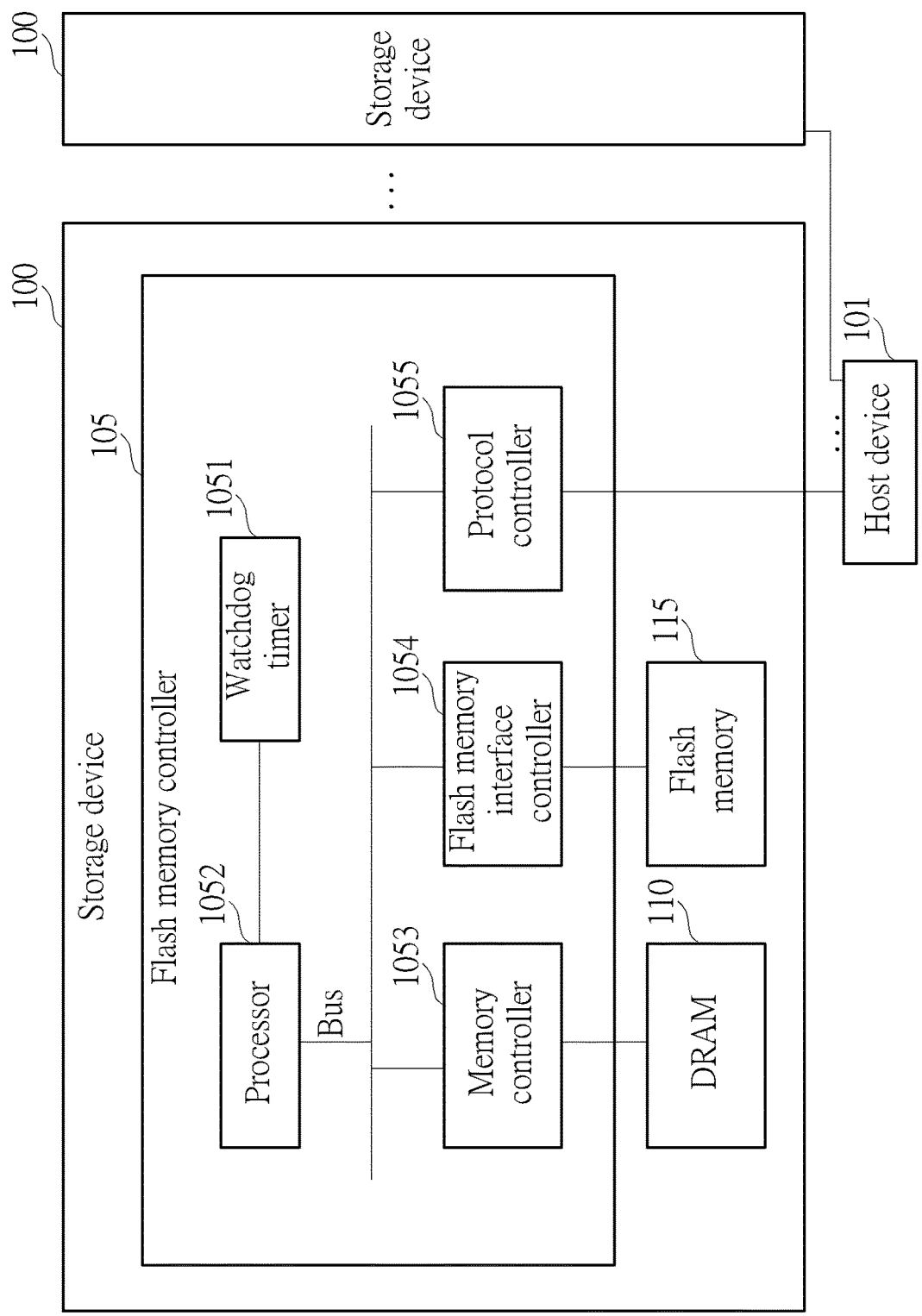
FIG. 1 is a diagram showing a mass production testing example at the factory side according to an embodiment of the invention.

Please refer to FIG. 1. FIG. 1 is a diagram showing a mass production testing example at the factory side according to an embodiment of the invention. A user or an operator at the factory side manually uses the host device 101, e.g. a computer device, to execute a testing procedure (or an automatic testing procedure/program) to test multiple storage devices 100 which are individually coupled to the host device 101 for the mass production testing. The testing procedure may send command(s) from the host device 101 to each of the multiple storage devices 100 to read/write data into the each storage device 100 for the mass production testing. If a particular storage device 100 fails during the mass production testing, i.e. a fault occurs during data reading/writing, then the storage device 100 is arranged to store or record corresponding fault/failure information of cause of failure in a memory such as a dynamic random access memory (DRAM) and/or a flash memory. In this situation, the user or operator can use a parse software tool of the testing procedure/program to retrieve or read the corresponding fault/failure information from the storage device 100 and then to parse/analyze the corresponding fault/failure information to display information on a screen of the host device 101 for the user/operator. The user/operator can easily debug or know the cause of failure based on the parsed information.

In practice, the storage device 100 for example is a solid-state drive (SSD) device according to embodiments of the invention. The storage device 100 comprises a flash memory controller 105, a DRAM 110 externally coupled to the flash memory controller 105, and a flash memory 115 (e.g. a NAND-type flash memory) externally coupled to the flash memory controller 105. The flash memory controller 105, DRAM 110, and flash memory 115 may be installed on the same printed circuit board (PCB); however, this is not intended to be a limitation. The flash memory controller 105 comprises a watchdog timer 1051, a processor 1052 such as an ARM-based microcontroller, a memory controller 1053, a flash memory interface controller 1054, and a protocol controller 1055.

The memory controller 1053 is coupled between the processor 1052 and DRAM 110, and it is controlled by the processor 102 to access the DRAM 110. The flash memory interface controller 1054 is coupled between the processor 1052 and the flash memory 115 such as NAND-type flash memory, and it is controlled by the processor 1052 to read/write/erase data stored in the flash memory 115. The protocol controller 1055 is coupled between the processor 1052 and host device 101, and it is controlled by the processor 1052 to receive a command sent from the host device 101 and send a response from the protocol controller 1055 to the host device 101. In this embodiment, the memory controller 1053, flash memory interface controller 1054, and protocol controller 1055 are coupled to the processor 1052 via an internal shared bus of the flash memory controller 105. However, this is not meant to be a limitation. In other embodiments, the memory controller 1053, flash memory interface controller 1054, and protocol controller 1055 may be arranged to be coupled to the processor 1052 separately and individually via different buses.

Each storage device 100 is arranged to initiate the watchdog timer 1051 when the storage device 100 is powered on to be tested. The watchdog timer 1051 is used to detect whether a fault/failure of a corresponding storage device 100 occurs. If the fault/failure occurs, then the storage device 100 is arranged to copy corresponding fault/failure information into the DRAM 110 and then copy the corresponding fault/failure information into the flash memory 115 to avoid data disappear if the storage device 100 is not powered.

The watchdog timer 1051 is coupled to the processor 1052, and is used for automatically counting a number when it is powered on initially and used for generating a reset trigger signal to the processor 1052 if the number counted by the watchdog timer 1051 is higher than a specific threshold. The watchdog timer 1051 will timeout if the number counted by the watchdog timer 1051 becomes higher than the specific threshold, and then is arranged to generate and send such reset trigger signal. If the watchdog timer 1051 is serviced by the processor 1052 before it timeouts, the number counted by the watchdog timer 1051 is reset as zero. That is, the processor 1052 is used to reset the watchdog timer 1051. The processor 1052 is arranged to periodically detect a communication channel/bus between the processor 1052 and at least one of the flash memory interface controller 1054 and protocol controller 1055. Ideally, if a user/operator uses the host device 101 to send read/write commands to the storage device 100 during the mass production testing procedure, the protocol controller 1055 may receive the read/write commands and send corresponding signals/command to the processor 1052. Also, in this situation, the flash memory interface controller 1054 during the testing procedure may continuously read data from the flash memory 115 to send the data to the processor 1052 or receive data from the processor 1052 to write the data into the flash memory 1054. If the processor 1052 detects that the communication channel/bus between the processor 1052 and the flash memory interface controller 1054 and the communication channel/bus between the processor 1052 and protocol controller 1055 are not idle during the testing procedure, the processor 1052 determines that the storage device 100 currently works and then is arranged to service the watchdog timer 1051, i.e. reset the number counted by the watchdog timer 1051. Timeout of the watchdog timer 1051 indicates that the flash memory interface controller 1054 and/or protocol controller 1055 during the read/write testing procedure may be at an idle state for a specific time period, and this indicates a fault/failure occurs.

Additionally, it should be noted that the function/operation of the watchdog timer 1051 is arranged to be disabled when the storage device 100 successfully passes the mass production testing procedure; however, this is not intended to be a limitation.

Figure 2:
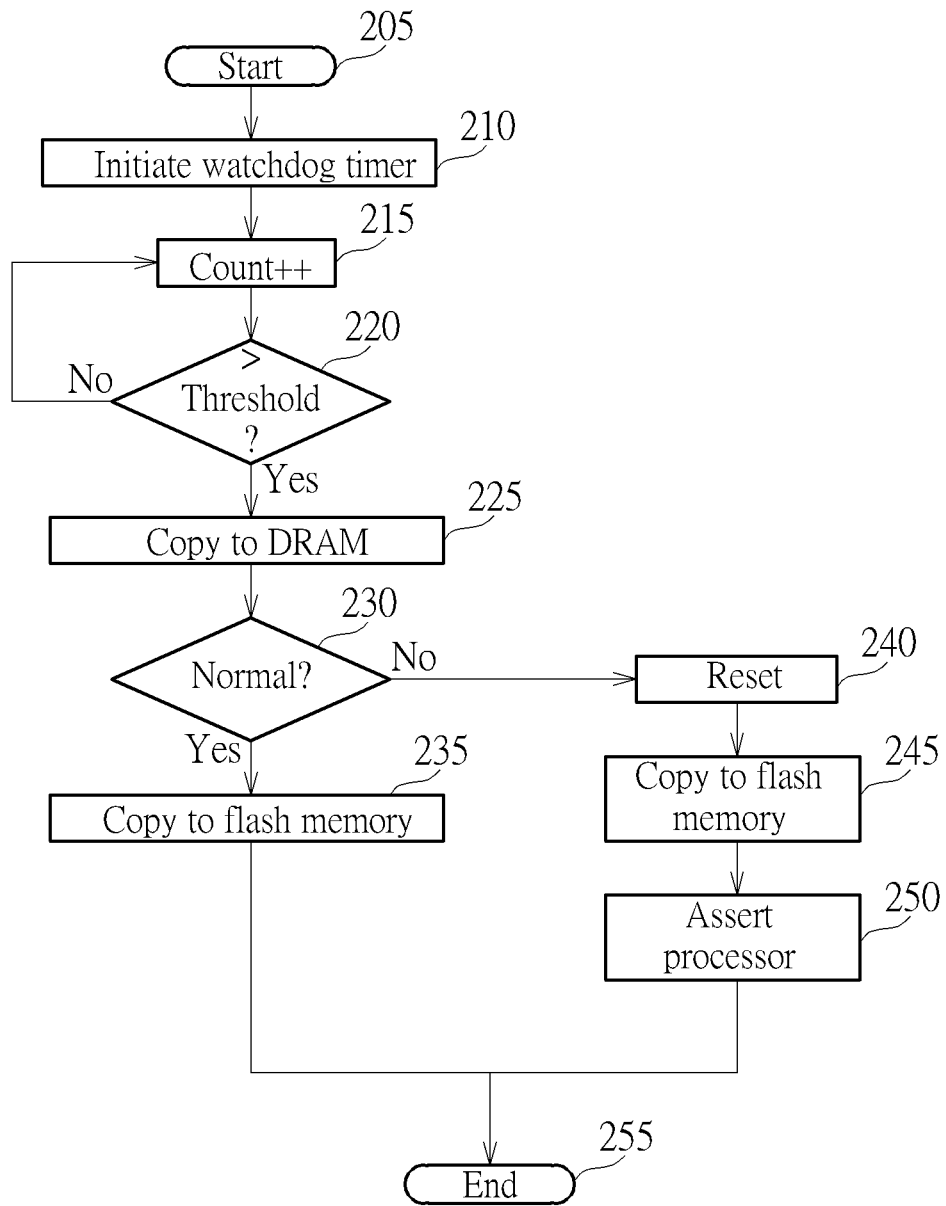
FIG. 2 is a flowchart diagram of operation/function of flash memory controller of FIG. 1 according to an embodiment of the invention.

FIG. 2 is a flowchart diagram of operation/function of flash memory controller 105 of FIG. 1 according to an embodiment of the invention. Provided that substantially the same result is achieved, the steps of the flowchart shown in FIG. 2 need not be in the exact order shown and need not be contiguous, that is, other steps can be intermediate. Steps are detailed in the following:

Step 205: Start;

Step 210: Initiate the watchdog timer 1051 when the storage device 100, which is to be tested during the testing procedure, is powered on;

Step 215: Count the number;

Step 220: Determine whether the number is larger than the threshold; if the number is larger than the threshold, the flow proceeds to Step 225, otherwise, the flow proceeds to Step 215;

Step 225: Copy the corresponding fault/failure information used for debugging into the DRAM 110;

Step 230: Determine whether the flash memory interface controller 1054 is normal; if the controller 1054 is normal, the flow proceeds to Step 235, otherwise, the flow proceeds to Step 240;

Step 235: Copy or move at least one portion of the corresponding fault/failure information used for debugging from the DRAM 110 into the flash memory 115;

Step 240: Reset the registry information of the flash memory interface controller 1054;

Step 245: Copy or move at least one portion of the corresponding fault/failure information used for debugging (i.e. debug information) from the DRAM 110 into the flash memory 115;

Step 250: Assert the working state of the processor 1054; and

Step 255: End.

In Step 215, the watchdog timer 1051 is arranged to automatically count the number one time after the storage device 100 is supplied with power. For example, the value of the counted number may become N+1 from N wherein N is an integer.

In Step 220, the watchdog timer 1051 is arranged to compare the value of the counted number with the specific threshold. If the value such as N+1 becomes larger than the specific threshold, then the watchdog timer 1051 generates and sends the reset trigger signal from the watchdog timer 1051 to the processor 1052. If the value such as N+1 is not larger than the specific threshold, the flow goes back to Step 215, and the value of the counted number may become N+2 from N+1.

In Step 225, the processor 1052 receives the reset trigger signal from the watchdog timer 1051, and then is arranged to control the memory controller 1053 by sending a first control signal to the memory controller 1053 via the internal bus. In this situation, the processor 1052 determines that a fault/failure occurs, then retries the corresponding fault/failure information used for debugging, and then copies and stores the corresponding fault/failure information into the DRAM 110 by controlling the memory controller 1053 to write the corresponding fault/failure information into the DRAM 1053.

The corresponding fault/failure information for example comprises at least one of registry information of the processor 1052, registry information of the flash memory interface controller 1054, and registry information of the protocol controller 1055. Each set of the registry information for example comprises instruction(s) executed or to be executed, firmware variables, and/or hardware variables such as variables of a finite state machine. However, this is not meant to be a limitation.

Then, in Step 230, the processor 1052 is arranged to determine whether the working state of the flash memory interface controller 1054 is normal or abnormal. For instance, in one embodiment, the processor 1052 can be arranged to check a command queue of the flash memory interface controller 1054 to determine whether the command queue is empty or not. If the command queue is empty, then the processor 1052 determines that the working state of the flash memory interface controller 1054 is normal. If the command queue is not empty, then the processor 1052 determines that the working state of the flash memory interface controller 1054 is abnormal.

Alternatively, in other embodiments, the processor 1052 may be arranged to detect a specific firmware variable which is used to record a number of instructions that have been used to program data into the flash memory 115 successfully, to compare the specific firmware variable with a target number of instructions to determine whether the working state of the flash memory interface controller 1054 is normal, and to determine that the working state of the flash memory interface controller 1054 is abnormal if the number recorded by the specific firmware variable is not equal to the target number of instructions.

When it is determined that the flash memory interface controller 1054 is normal in Step 230, then in Step 235 the processor 1052 is arranged to send a second control signal to the flash memory interface controller 1054 to control the flash memory interface controller 1054 to write at least one portion of the corresponding fault/failure information which has been recorded in the DRAM 110 previously into the flash memory 115. It should be noted that the processor 1052 may control the memory controller 1053 by sending the first control signal so as to make the memory controller 1053 to read back a portion or all of the corresponding fault/failure information from the DRAM 110 and then reply the corresponding fault/failure information to the processor 1052. Then, the processor 1052 sends the portion or all of the corresponding fault/failure information and the second control signal to the flash memory interface controller 1054 to control the controller 1054 write the portion or all of the corresponding fault/failure information into page(s) of the flash memory 115. The content of corresponding fault/failure information does not disappear even though the storage device 100 is not supplied with power.

Instead, when it is determined that the flash memory interface controller is abnormal in Step 230, then in Step 240 the processor 1052 is arranged to reset the current registry information of the flash memory interface controller 1054 and then in Step 245 is arranged to send the second control signal to the flash memory interface controller 1054 to control the flash memory interface controller 1054 to write at least one portion of the corresponding fault/failure information which has been recorded in the DRAM 110 previously into the flash memory 115. Then, in one embodiment, in Step 250, a working state of the processor 1052 may be asserted after the corresponding fault/failure information and corresponding event log information have been respectively written into the flash memory 115. Asserting the state of the processor 1052 can avoid that the processor 1052 may continue executing erroneously; however, this is not intended to be a limitation of the invention.

Figure 3:
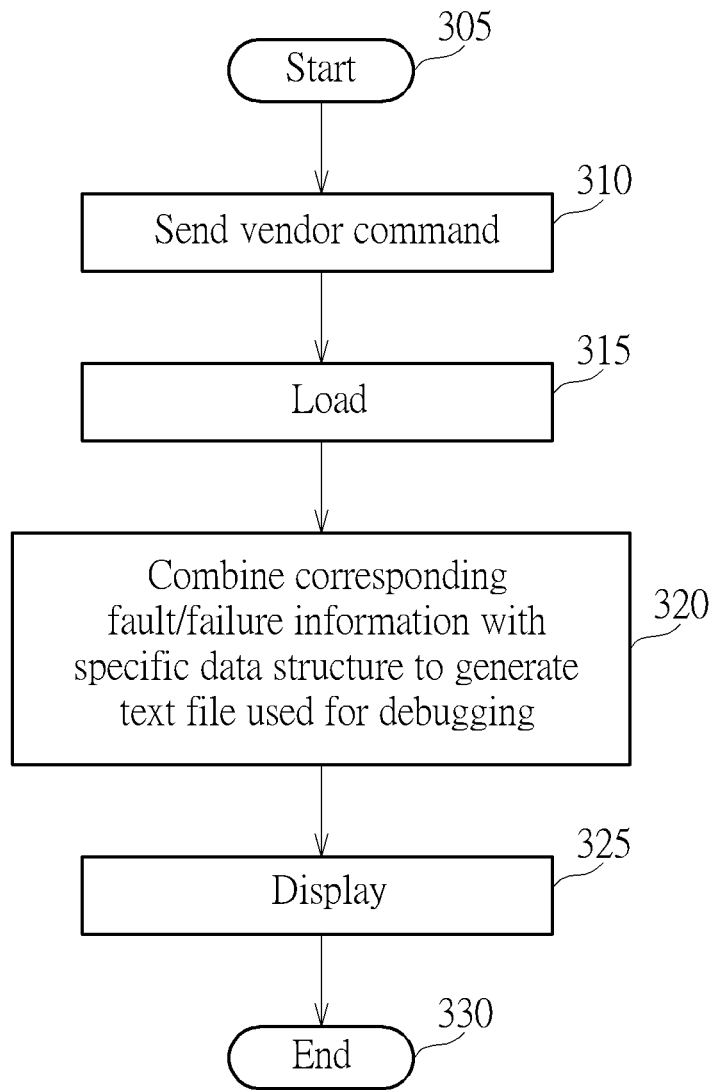
FIG. 3 is a diagram showing an example of a user/operator at the factory side to use the host device 101 to retrieve corresponding fault/failure information stored in the DRAM or flash memory within one storage device.

FIG. 3 is a diagram showing an example of a user/operator at the factory side to use the host device 101 to retrieve corresponding fault/failure information stored in the DRAM 110 or flash memory 115 within one storage device 100. Provided that substantially the same result is achieved, the steps of the flowchart shown in FIG. 3 need not be in the exact order shown and need not be contiguous, that is, other steps can be intermediate. Steps are detailed in the following:

Step 305: Start;
Step 310: Send vendor command;
Step 315: Load corresponding fault/failure information from the flash memory 115 into the host device 101;
Step 320: Combine the corresponding fault/failure information with a specific data structure to generate a specific text file used for debugging;
Step 325: Display content data of the specific text file for the user/operator on the screen of the host device 101; and
Step 330: End.

In Step 310, the user/operator at the factory side can use the host device 101 to execute the specific parse software tool to send a specific command such as a vendor command from the host device 101 to the protocol controller 1055, and then the protocol controller 1055 is arranged to notify the processor 1052 of the reception of the vendor command. Then, in Step 315, to reply the reception of the vendor command, the processor 1052 is arranged to control the flash memory interface controller 1054 to read the corresponding fault/failure information from the flash memory 115 and then transmit the corresponding fault/failure information to the protocol controller 1055 via the bus. The processor 1052 then controls the protocol controller 1055 to send the corresponding fault/failure information received from the flash memory interface controller 1054 to the host device 101. Equivalently, the host device 101 loads the corresponding fault/failure information from the flash memory 115.

In Step 320, after receiving a portion or all of the corresponding fault/failure information, the host device 101 is arranged to combine the corresponding fault/failure information with the specific data structure to generate a specific text file used for debugging. Then, in Step 325, the host device 101 is arranged to display content data of the specific text file for the user/operator on the screen of the host device 101.

It should be noted that the corresponding fault/failure information may be implemented by a binary file which may be stored in system block(s) of the flash memory 115. However, this is not intended to be a limitation.

Figure 4:
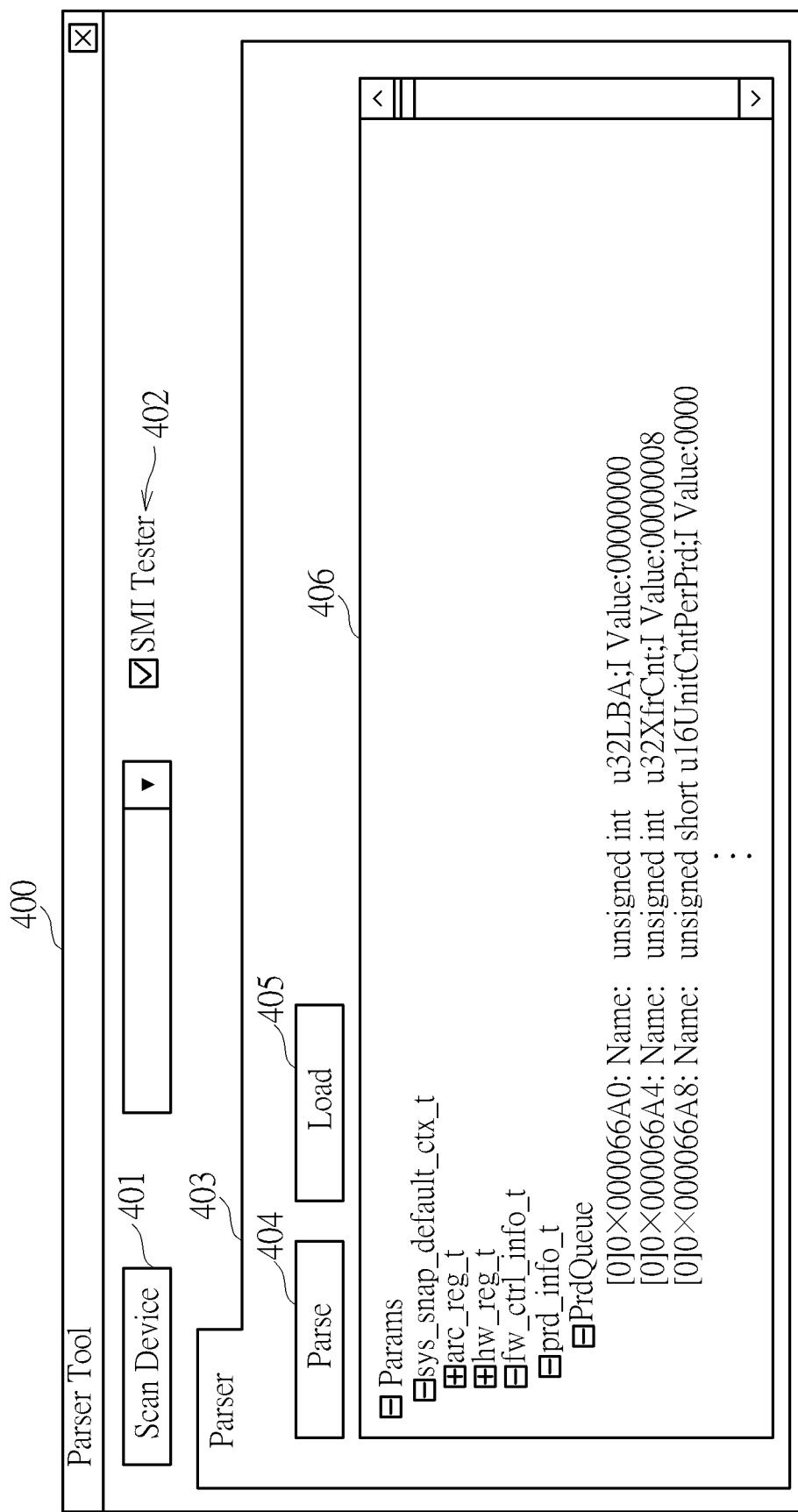
FIG. 4 is a diagram showing an example of a user interface of the specific parse software tool shown on the screen of the host device according an embodiment of the invention.

FIG. 4 is a diagram showing an example of a user interface 400 of the specific parse software tool shown on the screen of the host device 101 according an embodiment of the invention. For example, the user interface 400 comprises a button "Scan Device" 401, a checkbox "SMI Tester" 402, and a parser region 403. The parser region 403 comprises a button "Parse" 404, a button "Load" 405, and an information display region 406. The user/operator can press button "Scan Device" 401 to scan one, multiple, or all of storage devices which are coupled to the host device 101 to perform the mass production testing procedure. The user/operator can select the checkbox "SMI Tester" 402 to confirm the use of the functions of Silicon Motion's software tool. The user/operator can press the button "Load" 405 to load the corresponding fault/failure information from the flash memory 115 of storage device 100 into the host device 101. The user/operator can press the button "Parse" 404 to parse the loaded corresponding fault/failure information to generate a text file. After the parsing operation has been completed, the parser region 403 can be arranged to show or display a tree structure to display content data of the corresponding fault/failure information for the user/operator.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory controller, comprising:
   a watchdog timer, used for automatically counting a number when being powered and for generating a reset trigger signal to a processor if the number counted by the watchdog timer is higher than a specific threshold;
   the processor, coupled to the watchdog timer, used for receiving the reset trigger signal from the watchdog timer and for controlling other controller circuits;
   a memory controller, coupled to the processor, controlled by a first control signal sent from the processor to access a dynamic random access memory device externally coupled to the flash memory controller;
   a flash memory interface controller, coupled between the processor and a flash memory externally coupled to the flash memory controller, controlled by a second control signal sent from the processor to control the flash memory interface controller for reading data from the flash memory and writing data into the flash memory; and
   a protocol controller, coupled between the processor and a host device externally coupled to the flash memory controller, used for receiving a command sent from the host device and controlled by the processor to send a response from the protocol controller to the host device;
   wherein after receiving the reset trigger signal the processor is arranged to copy fault/failure information associated with at least one of the processor, the flash memory interface controller, and the protocol controller, and then to control the memory controller to write the copied information into the dynamic random access memory device.

2. The flash memory controller of claim 1, wherein the processor is arranged to copy registry information of the processor, registry information of the flash memory interface controller, and registry information of the protocol controller respectively into the dynamic random access memory device.

3. The flash memory controller of claim 1, wherein the copied fault/failure information comprises at least one of information of executed instruction(s), firmware variable(s), and hardware variable(s).

4. The flash memory controller of claim 1, wherein the processor is arranged to determine whether a working state of the flash memory interface controller is normal; if the working state of the flash memory interface controller is normal, the processor is arranged to control the flash memory interface controller to write at least one portion of registry information and corresponding event log information respectively into the flash memory.

5. The flash memory controller of claim 4, wherein if the working state of flash memory interface controller is not normal, the processor is arranged to reset register information of the flash memory interface controller and then to use the flash memory interface controller, which has been reset, to write the register information the corresponding event log information into the flash memory.

6. The flash memory controller of claim 4, wherein the processor is arranged to detect a command queue of the flash memory interface controller, and the processor determines that the working state of the flash memory interface controller is normal if the watchdog timer times out as well as the command queue is empty.

7. The flash memory controller of claim 4, wherein the processor is arranged to detect a specific firmware variable which is used to record a number of instructions that have programed data into the flash memory successfully; and, the processor is arranged to compare the specific firmware variable with a target number of instructions to determine whether the working state of the flash memory interface controller is normal; if the number recorded by the specific firmware variable is not equal to the target number of instructions, the processor determines that the working state of the flash memory interface controller is not normal.

8. The flash memory controller of claim 1, wherein the processor is arranged to determine whether a working state of the flash memory interface controller is normal; if the working state of the flash memory interface controller is not normal, the processor is arranged to reset information of the flash memory interface controller and then to control the flash memory interface controller to write at least one portion of registry information and corresponding event log information respectively into the flash memory.

9. The flash memory controller of claim 8, wherein a working state of the processor is asserted after the registry information and the corresponding event log information have been respectively written into the flash memory.

10. The flash memory controller of claim 1, wherein the memory controller, the flash memory interface controller, and the protocol controller are coupled to the processor via an internal shared bus comprised within the flash memory controller.

11. A method used in a flash memory controller, comprising:
- using a watchdog timer to automatically count a number when being powered and to generate a reset trigger signal to a processor of the flash memory controller if the number counted by the watchdog timer is higher than a specific threshold;
- receiving the reset trigger signal from the watchdog timer and controlling other controller circuits;
- sending a first control signal from the processor to a memory controller of the flash memory controller to control the memory controller to access a dynamic random access memory device externally coupled to the flash memory controller;
- sending a second control signal from the processor to a flash memory interface controller of the flash memory controller to control the flash memory interface controller to read data from a flash memory externally coupled to the flash memory controller and to write data into the flash memory;
- using a protocol controller to receive a command sent from the host device and using the processor to control the protocol controller to send a response from the protocol controller to the host device; and
- after receiving the reset trigger signal from the watchdog timer, using the processor to copy fault/failure information associated with at least one of the processor, the flash memory interface controller, and the protocol controller, and then to control the memory controller to write the copied information into the dynamic random access memory device.

12. The method of claim 11, further comprising:
- using the processor to copy registry information of the processor, registry information of the flash memory interface controller, and registry information of the protocol controller respectively into the dynamic random access memory device.

13. The method of claim 11, wherein the copied fault/failure information comprises at least one of information of executed instruction(s), firmware variable(s), and hardware variable(s).

14. The method of claim 11, further comprising:
- determining whether a working state of the flash memory interface controller is normal; and
- using the processor to control the flash memory interface controller to write at least one portion of registry information and corresponding event log information respectively into the flash memory if the working state of the flash memory interface controller is normal.

15. The method of claim 14, further comprising:
- using the processor to reset register information of the flash memory interface controller and then to use the flash memory interface controller, which has been reset, to write the register information the corresponding event log information into the flash memory if the working state of flash memory interface controller is not normal.

16. The method of claim 14, wherein the determining step comprises:
- detecting a command queue of the flash memory interface controller; and
- determining that the working state of the flash memory interface controller is normal if the watchdog timer times out as well as the command queue is empty.

17. The method of claim 14, wherein the determining step comprises:
- detecting a specific firmware variable which is used to record a number of instructions that have programed data into the flash memory successfully;
- comparing the specific firmware variable with a target number of instructions to determine whether the working state of the flash memory interface controller is normal; and
- determining that the working state of the flash memory interface controller is not normal if the number recorded by the specific firmware variable is not equal to the target number of instructions.

18. The method of claim 11, further comprising:
- determining whether a working state of the flash memory interface controller is normal; and
- using the processor to reset information of the flash memory interface controller and then to control the flash memory interface controller to write at least one portion of registry information and corresponding event log information respectively into the flash memory if the working state of the flash memory interface controller is not normal.

19. The method of claim 18, further comprising:
- asserting a working state of the processor after the registry information and the corresponding event log information have been respectively written into the flash memory.

20. The method of claim 11, further comprising:
- using the processor to reset the watchdog timer when detecting a signal sent from the flash memory interface controller to the processor or a signal sent from the protocol controller to the processor.

* * * * *